United States Patent [19]

von Arb et al.

[11] Patent Number: 4,881,233
[45] Date of Patent: Nov. 14, 1989

[54] LASER WITH IMPROVED COOLING SYSTEM

[76] Inventors: Hans-Peter von Arb, Kapfstrasse 38, 6020 Emmenbrücke, Switzerland; Ulrich Dürr, Mozartstrasse 28, 7310 Plochingen, Fed. Rep. of Germany; André Gressly, Honeggweg 16a, 3610 Steffisburg; Franz Studer, Dammstrasse 34, 5200 Windisch, both of Switzerland

[21] Appl. No.: 209,708

[22] Filed: Jun. 22, 1988

[30] Foreign Application Priority Data

Jun. 22, 1987 [FR] France ............................. 87 08791

[51] Int. Cl.$^4$ ............................................. H01S 3/045
[52] U.S. Cl. ........................................ 372/35; 372/66; 372/72
[58] Field of Search ..................... 372/34, 35, 66, 70, 372/72

[56] References Cited

U.S. PATENT DOCUMENTS 3,665,335 5/1972 Tomiyasu .......................... 330/4.3
4,769,823 9/1988 Dubé ................................ 372/70

Primary Examiner—James W. Davie
Attorney, Agent, or Firm—Kevin McMahon

[57] ABSTRACT

A laser has a slab in which the beam F is propagated in zig-zag manner between two opposing faces which have the property of ensuring total reflection. For this purpose each of these faces is covered with a solid layer of a good heat conducting material and having a refractive index below that of the slab. Its thickness is preferably greater than three times the operating wavelength of the laser. Thus, a cooling fluid can be in contact with the solid layer to effectively cool the slab. Pumped energy sources are preferably provided opposite the layers.

19 Claims, 6 Drawing Sheets

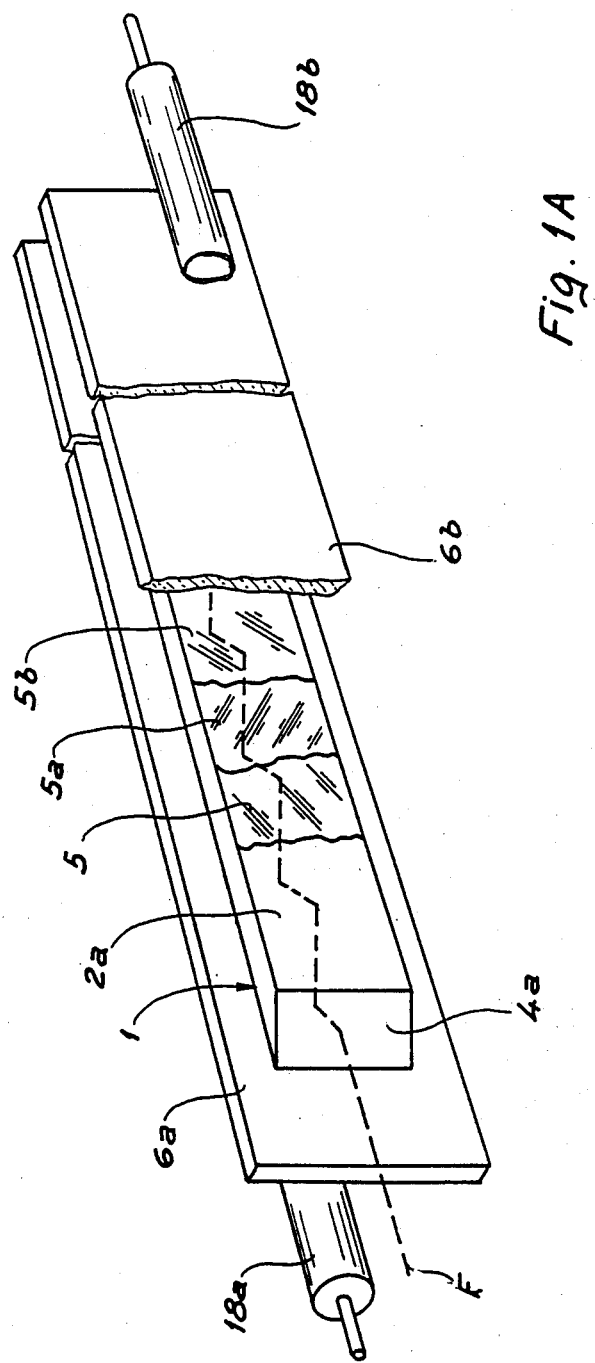

LASER WITH IMPROVED COOLING SYSTEM

BACKGROUND OF THE INVENTION

The present invention relates to optical pumped lasers the active medium of which is composed of a slab. Lasers of this type have a solid active medium having at least two carefully polished parallel faces between which the light beam is propagated along a zig-zag path due to the total reflection from these faces. The thermal energy arising during the laser process must be removed from the faces of the slab. The optical pumped energy needed to produce the laser effect can be introduced into the slab from any direction, provided that it is distributed in homogenous manner, or that non-homogeneous distribution of this energy in the laser medium is eliminated by appropriate guiding of the laser beam. The zig-zag path resulting from total reflection of the beam from the faces is obtained by suitable choice of this type and position of the end faces of the slab in relation to the optical axis thereof and the optical axis of the resonator. Moreover, these end faces can in themselves constitute the resonator. The construction of lasers of this type poses a difficult cooling problem since currently, in the best possible case, only a few percent of the energy supplied to the slab are transformed into energy emitted from the laser beam. This problem is all the more difficult to resolve since the previously proposed solutions cause incompatibility in respect of the liquids used to remove excess heat developed in the laser slab.

Description of the Prior Art

It is taught by U.S. Pat. No. A-3,679,999, that when a cooling liquid is used as a heat transfer fluid which is in direct contact with the total reflection faces, effective cooling is obtained because a liquid has a high heat absorption capacity. However, this solution has several disadvantages from the optical point of view. If the laser medium has a low coefficient of refraction, the losses at the total reflection surface become very great and the number of reflections of the beam on the parallel faces becomes low. Moreover, there is a risk that the cooling liquid could contaminate the parallel faces and increase the losses still further. Finally, since the material of the slab has a certain, albeit very small, degree of solubility in relation to the liquid, the quality of the surface of the total reflecting faces deteriorates in the long term.

If a cooling gas is used it is possible to obtain a better optical result since the refractive index of a gas is generally low, thereby improving total reflection and increasing the number of reflections of the laser beam. Nevertheless, a gas is a poor medium for heat transfer, with the result that this solution requires a very low thickness of the gas layer perpendicular to the total reflection faces.

This solution was nevertheless chosen in the above-mentioned American patent, which therefore results in certain disadvantages.

Firstly, the enclosure containing the gas must be sealed and its thickness chosen with precision along the entire area of the total reflection faces. Since this thickness is of the order of the dimension of the wavelength of the laser beam, the manufacturing difficulties related to the construction of such an enclosure can easily be imagined, particularly in the case of large laser slabs.

In addition, the gas must have as high as possible a coefficient of thermal conduction, helium being the most suitable in this case. There are, however, complications in the use thereof.

Finally, the gas can also cause some soiling of the total reflection faces.

OBJECTS OF THE INVENTION

It is an object of the invention to provide an optical pumped laser of the type described above, but without the disadvantages of the prior art.

BRIEF SUMMARY OF THE INVENTION

The invention thus provides an optical pumped laser in which the laser medium is formed by a slab having at least two opposing faces between which the laser beam developed is propagated along a zig-zag path by total reflection from these faces, this laser being provided with means for cooling said parallel faces and being characterized in that it also has a layer of solid material applied to each of these parallel faces respectively, this solid material having a refractive index lower than that of the slab and being at least indirectly in heat exchanging relationship with a cooling fluid.

BRIEF DESCRIPTION OF THE INVENTION

A cooling system for a laser slab devised in this manner combines the advantages of the two methods formerly used whilst eliminating the disadvantages.

It is a relatively straightforward matter to produce a solid layer having a constant thickness and very great optical homogeneity in such a way that the total reflection conditions are precisely the same across the entire area of the slab faces from which this total reflection occurs.

In addition, the solid layer can be formed in such a way as to possess an excellent heat transfer coefficient, thus making an important contribution to improved cooling of the slab.

The solid layer can be in direct contact with the cooling liquid and form on its own protection against the deleterious effects of the liquid. It is also possible to superimpose on the solid layer other protective layers or layers possessing predetermined optical properties (antireflective, for example).

The other layers can be deposited by physical or chemical means or held mechanically against the first solid layer.

In addition, all the layers can be optimized for the transmission of the pumped energy if the total reflection faces are also the faces of the slab through which the pumped energy is introduced into the slab.

BRIEF DESCRIPTION OF THE DRAWINGS

The invention will be better understood from the teachings of the following description of a preferred embodiment of the invention.

In the attached drawings, which are provided solely for purposes of illustration and are in no way to be construed as limiting.

FIG. 1A shows a very schematic perspective view of a laser of the invention, showing the superposition of several layers onto the total reflection faces of the laser slab;

DETAILED DESCRIPTION OF THE PREFERRED EMBODIMENTS OF THE INVENTION

Figure 1:
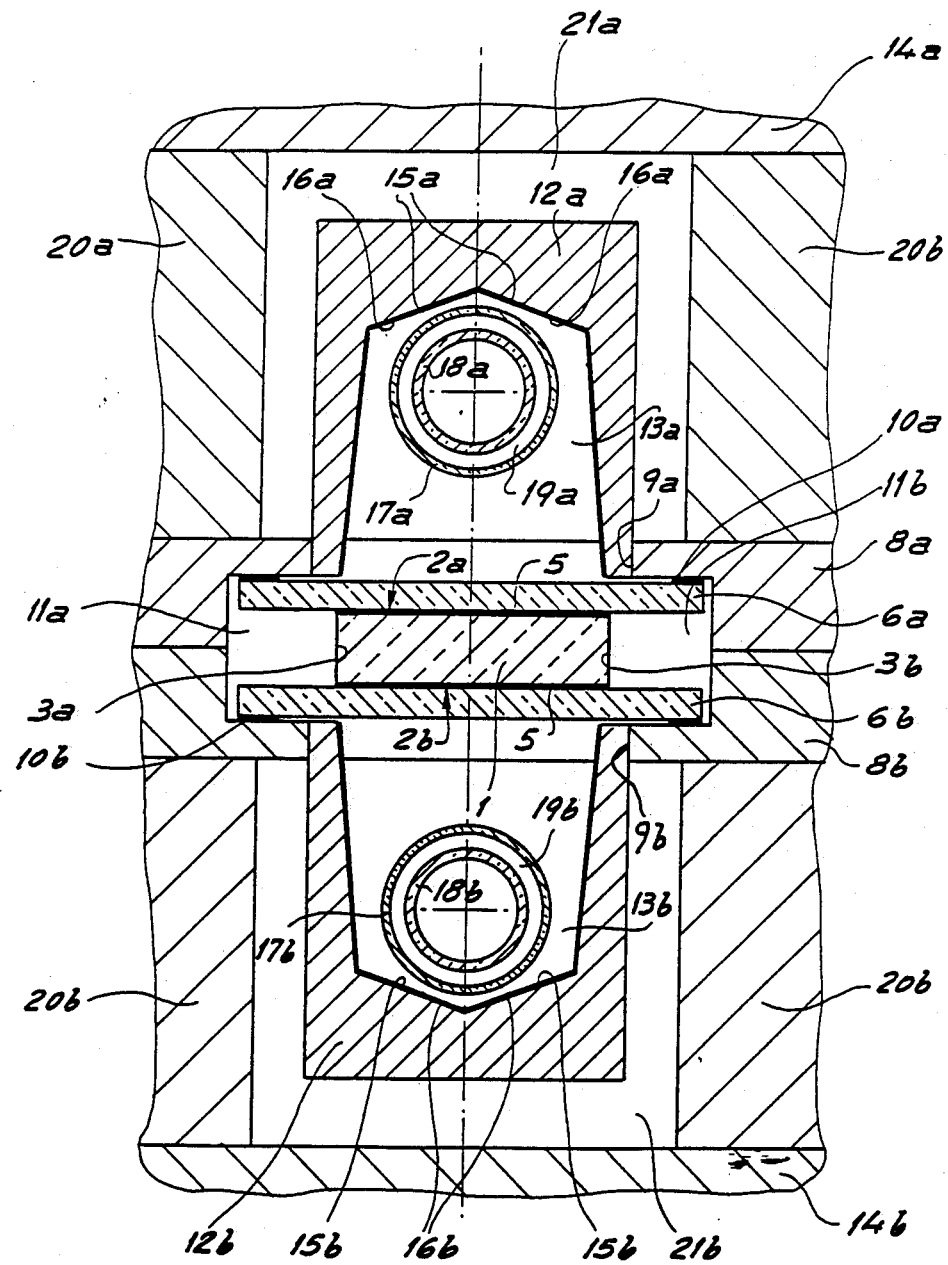
FIG. 1 is a partial view of a transverse section on a large scale of a laser manufactured according to the invention.

Reference will first be made to FIGS. 1 and 1A which show the main features of the invention.

Figure 2:
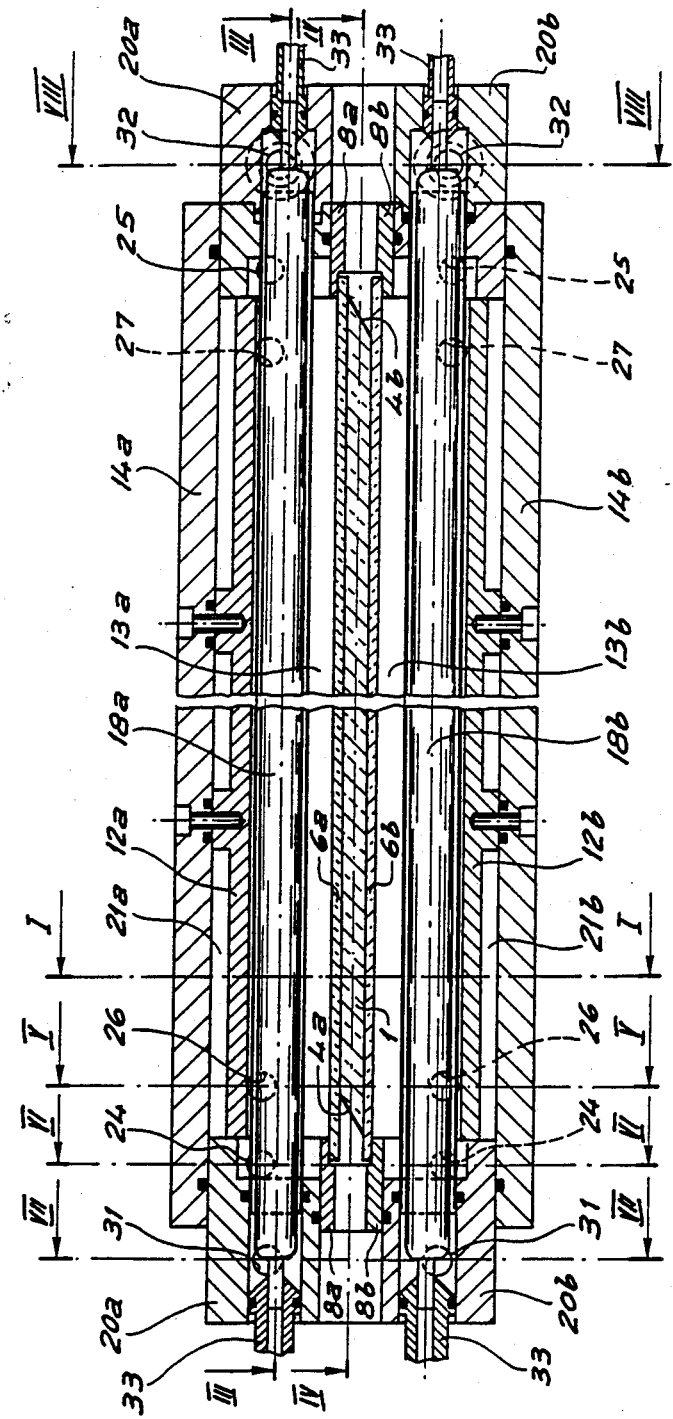
FIG. 2 is a longitudinal sectional view on a small scale of this same laser.

A slab constitutes the medium in which the laser effect is developed. In the embodiment shown, this slab 1 has a rectangular section with two main faces 2a and 2b which are, in this case, the pumping faces and the total reflection faces for conferring a zig-zag path to the beam F produced. The slab also has two lateral faces 3a and 3b and two end faces 4a and 4b (FIG. 2). In the example shown, which relates to a linear resonator, these latter are cut into the slab 1 more or less at the Brewster angle ($\alpha$) in order to reduce losses. The end faces may, however, also be straight or inclined at $180°-2\alpha$ in relation to the optical axis of the laser.

In accordance with the invention, each of the main faces 2a and 2b is provided with at least one solid layer 5 (FIG. 1 in particular) the refractive index of which is lower than that of the slab 1. This layer is transparent to pumped light and has a good heat transfer coefficient. In addition it protects the slab from the cooling liquid as will become apparent later on.

The table set out below lists the materials that can be used to form the layer 5 in combination with the conventional materials from which the slab 1 can be made. These latter materials can be arbitrarily divided into two categories. The one of low refractive index and the other of high refractive index. In the former case, stoichiometric vitreous materials can be used, that may be doped, or metal halide crystals. In the second case, the material of the slab 1 can, for example, be a garnet or a metal oxide crystal.

TABLE

| Low index (<1.6) | | High index (>1.6) | |
|---|---|---|---|
| Slab 1 Laser material (host crystal) | Layer 5 | Slab 1 Laser material (host crystal) | Layer 5 |
| Phosphate glass | SiO$_2$ | YAG | SiO$_2$ |
| | MgF$_2$ | GSGG | MgF$_2$ |
| | BaF$_2$ | GGG | BaF$_2$ |
| | AlF$_3$ | YAP | AlF$_3$ |
| | CaF$_2$ | Al$_2$O$_3$ | CaF$_2$ |
| Silicate glass | | BEL | Al$_2$O$_3$ |
| | | LaF$_3$ | CaO.SiO$_2$ |
| | | | NdF$_3$ |

In each of these cases, an optimum couple for the material of the slab and the material of layer 5 can be selected from those shown in the table.

The thickness of the layer 5 is preferably selected between 3 and 0.1 mm, being the operating wavelength used by the laser. It may be applied against the corresponding face 2a, 2b by any suitable physical or chemical process known to the person skilled in the art. In addition, in order to convert into useful pumped energy all the dispersed light which would be lost in the absence of doping, layer 5 may be doped with metal ions, for example those of transition metals such as Ti and Cr and/or rare earths such as Er (erbium) or Tm (thulium).

A second layer 5a (only shown in FIG. 1A) can be provided over the layer 5 that has just been described, particularly when this is likely to be affected by the cooling liquid. This additional layer 5a may be composed of SiO$_2$, Al$_2$O$_3$, CaO.SiO$_2$, BeAl$_2$O$_4$ and other analogous materials, its properties needing to be compatible with a good heat transfer and, in the present case, with excellent transmission of the pumped energy. The layer 5a may be deposited using physical or chemical means onto the first layer 5 (as shown in the drawings) or can be mechanically held thereagainst, in which case the layer 5a is a thin sheet. In common with the first layer 5, the second, 5a, may be doped with ions of a transition metal or of a rare earth which can be the same as that used for layer 5.

As shown in FIG. 1A, a third layer 5b of the anti-reflective type can be provided on the second layer 5a or, if this is not provided on the first layer, in order to improve pumping efficiency.

In the case shown in the figures, the layer 5a and its anti-reflective layer 5b are deposited on the layer 5. A transparent foil 6a, 6b respectively, made for example of sapphire or alexandrite, is mechanically applied to these layers. Each foil 6a, 6b preferably overlaps on each side of the slab 1 to a distance equal to or greater than the thickness thereof.

The assembly shown in FIG. 1A is placed between two retaining plates 8a, 8b which extend virtually the entire length of the laser and each have a rectangular opening 9a, 9b corresponding generally to the length of the slab 1 whilst its width slightly exceeds the width thereof. The two retaining plates 8a and 8b are fitted on one another in such a way as to press the stack formed of the slab 1 between them with a suitable pressure, and layers 5, 5a and 5b, foils 6a and 6b and a set of seals 10a, 10b ensuring sealing near the periphery of the opening 9a, 9b. The spaces 11a and 11b defined laterally outside the slab 1 are filled with a gas having a low heat transfer coefficient, such as nitrogen or air.

Duct-shaped elongated pieces 12a, 12b are fitted into each of the rectangular openings 9a, 9b of the retaining plates 8a, 8b. These ducts define a circulation space 13a, 13b for a cooling fluid such as water and are fixed from the outside to outer mounting plates 14a, 14b of the laser (see, in particular, FIG. 2). The base and the lateral walls of each duct 12a, 12b are so formed as to present reflection faces 15a, 15b preferably furnished with a layer of gold 16a, 16b.

A tube 17a, 17b extends into each of the circulation spaces 13a, 13b and has disposed therein a discharge lamp 18a, 18b whilst defining thereabout a circulation conduit 19a, 19b for the cooling liquid for these lamps.

Between each retaining plate 8a, 8b and each outside mounting plate 14a, 14b there are provided two lateral transverse housings 20a, 20b which define said plate about the ducts 12a, 12b a channel 21a, 21b for circulation of a cooling liquid such as water.

Figure 3:
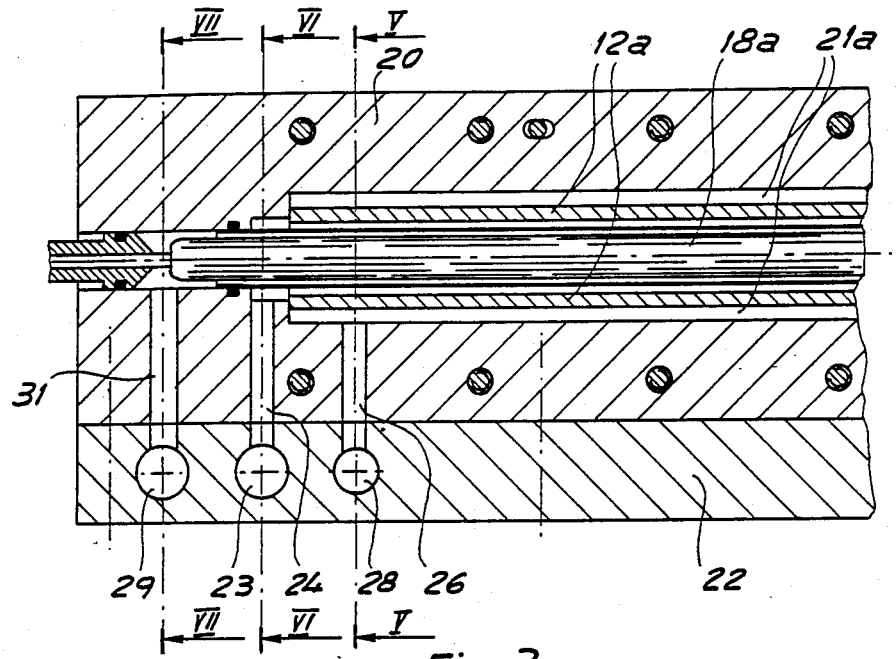
FIGS. 3 to 8 are partial or complete sectional views of the laser taken along the lines III—III to VIII—VIII respectively of FIG. 2 and drawn to different scales.
Figure 4:
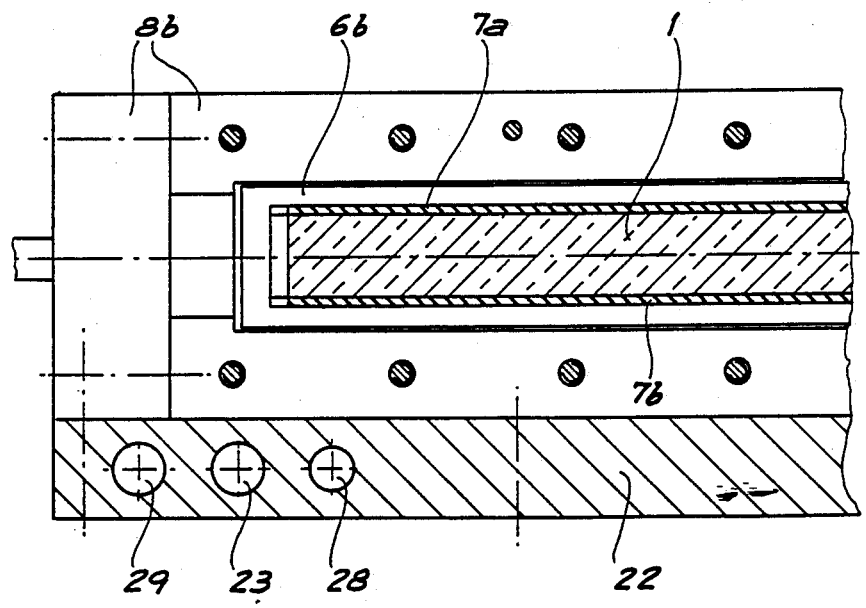

A lateral connection plate 22 (FIG. 3) extends along the entire length of the laser in order to permit the supply of cooling fluids to the three circuits with which the laser is equipped for this purpose.

Figure 5:
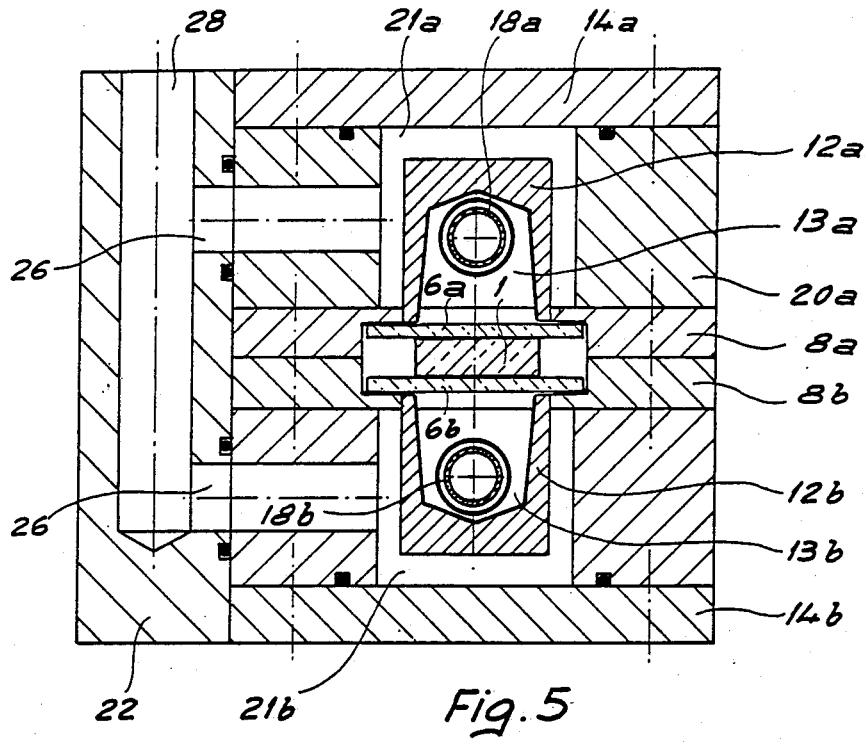

The first circuit comprises the spaces 21a and 21b which are joined with an inlet channel 28 (FIG. 5) provided in the lateral plate 22 and an outlet channel passing through this same plate (not visible on the drawings). The inlet channel 28 communicates with the corresponding passages 26 provided in the transverse housings 20a and 20b whilst the outlet channel is connected to the passages 27 also passing through these housings (on the right in FIG. 2).

Figure 6:
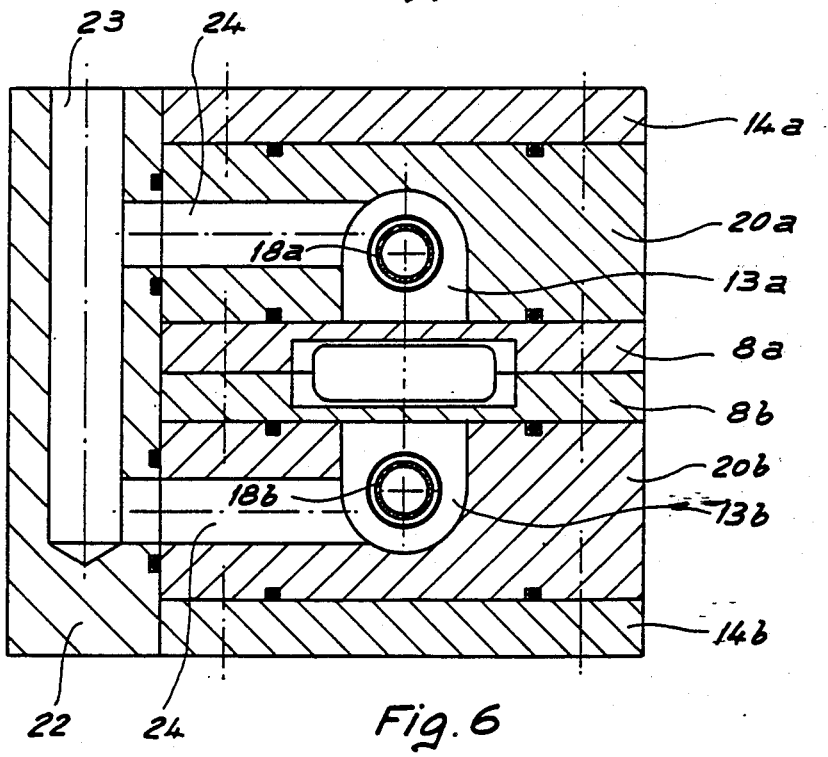

The second circuit has spaces 13a and 13b which communicate by means of passages 24 and 25 respectively provided in the housings 20a and 20b (FIG. 6) with an inlet conduit 23 and an outlet conduit (not visible in the drawing) both passing through the lateral connecting plate 22.

The third circuit is that which conveys the cooling liquid from the optical pumping sources 18a and 18b.

Figure 7:
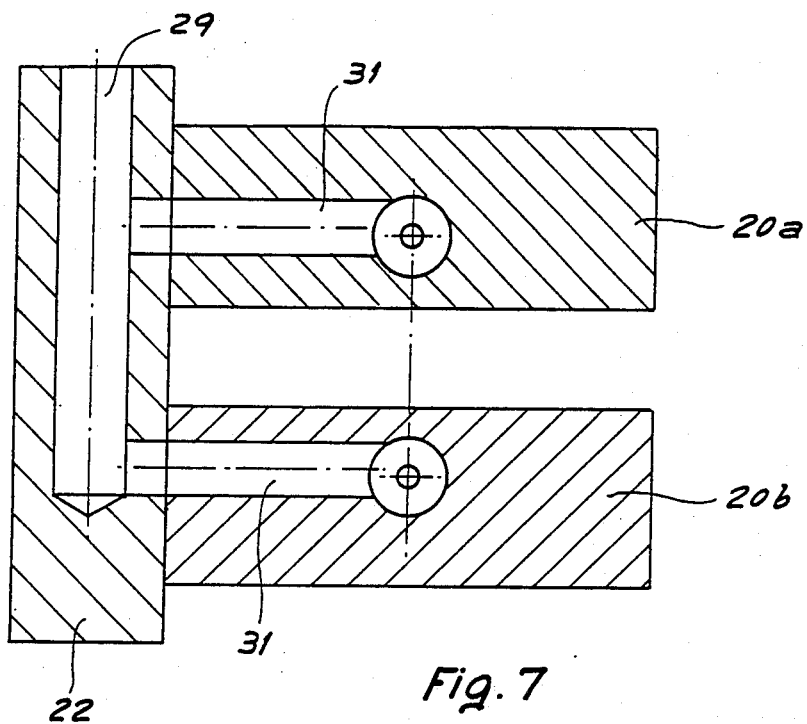
Figure 8:
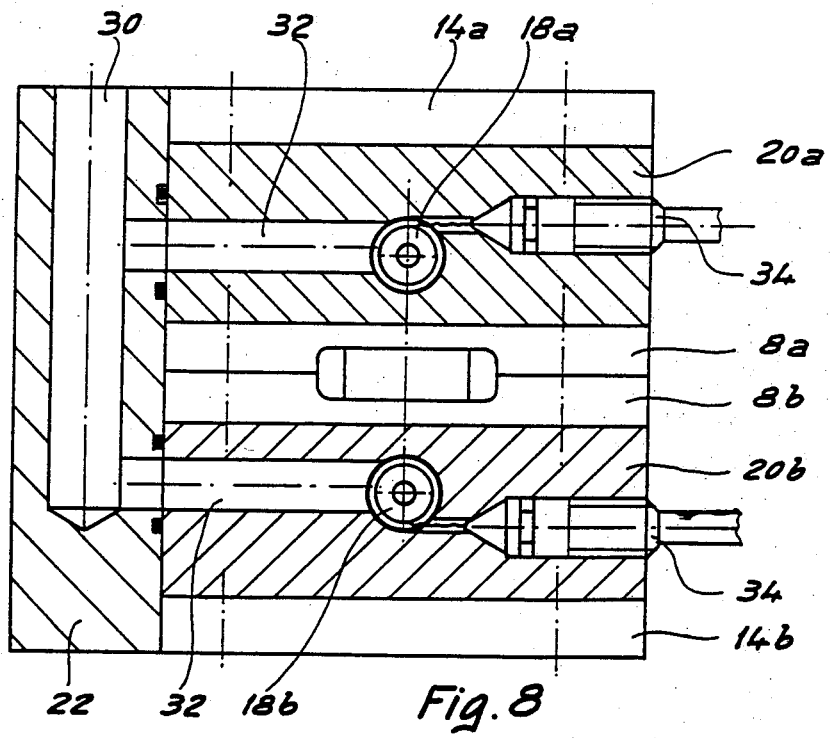

This circuit has an inlet channel 2 (FIG. 7) and an outlet channel 30 (FIG. 8) provided in the lateral connecting plate 22 as well as inlet 31 and outlet 32 passages provided in the transverse housings 20a and 20b (FIGS. 2, 7, and 8).

Electrical connection plugs 33 as well as connection plugs 34 are inserted in the transverse housings 20a and 20b (see FIGS. 2 and 8 respectively).

The arrangement of the three cooling circuits as described hereinabove makes it possible to select different fluids and differing flow speeds for each circuit so as to permit cooling closely adapted to the corresponding elements to be cooled. It is also possible to achieve a regular temperature gradient between the slab 1 and the exterior parts of the laser mounting.

What is claimed is:

1. A cooled optical pumped laser having a laser medium in the form of a slab, said slab having at least two opposing parallel pumping faces between which a laser beam develops by propagation along a zig-zag path by means of total reflection between said opposing parallel pumping faces whereby a monolayer of solid material is directly applied to each one of said opposing parallel pumping faces, said solid material having a refractive index less than that of the slab and being at least indirectly in heat exchanging relationship with a cooling fluid, and wherein the material of said monolayer of solid material is transparent to the optical energy used to excite the medium of said slab.

2. A laser according to claim 1, wherein each of said layer of solid material is applied to each pumping face of the slab by a physical or chemical deposition process.

3. A laser according to claim 1, wherein the thickness of the layer of solid material is at least three times the operating wavelength of the laser.

4. A laser according to claim 1, wherein said layer of solid material is formed of a metal oxide or composite metal oxide.

5. A laser according to claim 4, wherein said metal oxide or composite metal oxide is selected from the group consisting of $Al_2O_3$, $SiO_2$ or $CaO.SiO_2$.

6. A laser according to claim 1, wherein said layer is formed of a halide.

7. A laser according to claim 6, wherein the layer of solid material is formed of a halide selected from the group consisting of $MgF_2$, $BaF_2$, $AlF_3$, $CaF_2$, $LaF_3$ or $NdF_3$.

8. A laser according to claim 1, wherein said layer of solid material is doped with transition metal ions or rare earths.

9. A laser according to claim 8, wherein the transition metal ions or rare earths are selected from the group consisting of titanium (Tti), chromium (Cr), erbium (Er) or thulium (Tm).

10. A laser according to claim 1, wherein each layer of solid material applied to the parallel faces of the slab is covered by at least one second layer of a material that is a good heat conductor.

11. A laser according to claim 10, wherein said second layer is transparent to the optical energy serving to excite the medium of said slab.

12. A laser according to claim 11, wherein said second layer is applied to the first layer by means of a physical or chemical deposition process.

13. A laser according to claim 10, wherein said second layer is in the form of a sheet and is affixed to said first layer.

14. A laser according to claim 10, wherein said second layer is formed of a metal oxide selected from the group consisting of $SiO_2$, $Al_2O_3$, $CaO.SiO_2$ or $BeAl_2O_4$.

15. A laser according to claim 10, wherein said second layer is formed of a metal halide.

16. A laser according to claim 15, wherein the metal halide forming said second layer is selected from the group consisting of $MgF_2$, $AlF_3$, $CaF_2$, LiF or $KMgF_3$.

17. A laser according to claim 10, wherein a third anti-reflective layer is applied on said first or second layers.

18. A laser according to claim 10, wherein said second layer is held in place by a foil of transparent material that extends beyond the area of this second layer.

19. A layer according to claim 1, wherein the faces of the slab other than those with which the said first layer are in contact are exposed to a heat insulating medium such as air or nitrogen.

* * * * *